United States Patent [19]
Liedenbaum

[11] Patent Number: 5,648,863
[45] Date of Patent: Jul. 15, 1997

[54] OPTICAL COMMUNICATION SYSTEM

[75] Inventor: Coen T.H.F. Liedenbaum, Eindhoven, Netherlands

[73] Assignee: U.S. Phillips Corporation, New York, N.Y.

[21] Appl. No.: 529,186

[22] Filed: Sep. 15, 1995

[30] Foreign Application Priority Data

Sep. 15, 1994 [EP] European Pat. Off. .............. 94202661

[51] Int. Cl.$^6$ .............................. H04B 10/00; H04B 10/02
[52] U.S. Cl. .......................... 359/154; 359/173; 359/176; 359/179
[58] Field of Search ..................................... 359/154, 161, 359/173, 176, 179, 181, 188, 195; 375/256, 257

[56] References Cited

U.S. PATENT DOCUMENTS

| | | | |
|---|---|---|---|
| 4,979,234 | 12/1990 | Agraual et al. | 359/173 |
| 5,309,268 | 5/1994 | Nakamura et al. | 359/173 |

OTHER PUBLICATIONS

'High Speed Multiple–Quantum–Well Optical Power Amplifier'. by Wiensenfeld et. al. at pp. 708 to 711 of IEEE Photonics Technology Letters, vol. 4 No. 7, Jul. 1992.

*Primary Examiner*—Kinfe-Michael Negash
*Attorney, Agent, or Firm*—Leroy Eason

[57] ABSTRACT

An optical communication system includes a directly modulated semiconductor laser (10), the output of which results in pulse shortening of light pulses corresponding to high level bits of a high frequency electrical digital modulating signal. A travelling wave laser amplifier (14) coupled to the laser provides an amplified modulated light signal to an optical channel (16), and an optical detector (18) converts a light signal received from the optical channel into an electrical signal. The amplifier has an overshoot characteristic which provides an extended output when overdriven by a high level optical input pulse, and the modulated laser is arranged to provide such high level pulses. The overshoot characteristic of the amplifier thus compensates for pulse shortening produced by the modulated laser in the case of isolated high level bits and the initial bit of a stream of high level bits. The invention also relates to a transmitter and to a repeater for use in such an optical communication system.

5 Claims, 2 Drawing Sheets

OPTICAL COMMUNICATION SYSTEM

BACKGROUND OF THE INVENTION

1. Field of the Invention

The present invention relates to an optical communication system and to a transmitter and a repeater for use in an optical communication system. The invention has particular, but not exclusive, application to data communication at very high bit rates.

2. Description of the Related Art

In optical communication systems there is continual pressure to provide increased rates of communication at reasonable cost without sacrificing reliability. Much effort has been concentrated on improving the performance of the receiver but some work has also been done on improving the transmitted signal. By amplifying the optical signal which is fed to the channel greater range is obtained and hence fewer repeaters are required for a given transmission distance. However, such optical amplifiers, for example semiconductor optical amplifiers, exhibit characteristics such as pattern-dependent gain which ultimately reduces the performance of the system. In 'High Speed Multiple-Quantum-Well Optical Power Amplifier' by Wiesenfeld et. al. at pages 708 to 711 of IEEE Photonics Technology Letters, Vol. 4 No. 7, July 1992 this problem has been addressed by using a more sophisticated laser amplifier. However, this still produces a higher bit error rate (see FIGS. 3b and 3c) at the receiver of the system, for a given signal level, as compared to the optical source alone.

SUMMARY OF THE INVENTION

It is a first object of the present invention to provide a communication system which overcomes this disadvantage.

According to that aspect of the present invention there is provided an optical communication system comprising a light source, means for modulating the light source in response to an electrical signal to provide a modulated light signal having at least a high level and a low level, and an optical amplifier coupled to amplify the modulated light signal but which provides an output overshoot on saturation. The system further comprises an optical channel over which the amplified signal output from the amplifier is transmitted and an optical detector for converting the signal received from the optical channel to an electrical signal. The system is characterised in that the light source and the means for modulating the light source have an electro-optical transfer function which results in pulse shortening, and in that the high level of the modulated light signal overdrives the optical amplifier into saturation to provide output overshoot which compensates for the pulse shortening.

Thus, a semiconductor laser which was hitherto considered as inadequate or at least of rather poor performance can be used in conjunction with an optical amplifier which was also considered to be flawed to provide a high amplitude optical signal with good eye opening at high bit rates.

Performance of the system can be enhanced if the characteristics of both the light source and the optical amplifier are matched with the signal intensity at the input to the amplifier in such a way that the area under an intensity against time graph is substantially equal for the first bit of a pattern (or an isolated bit) and subsequent bits located in a longer pattern.

Since single bits at the high level are the most vulnerable, it has been found to be advantageous to use an amplifier having a gain saturation time approximately equal to the bit period. For a particular device this may be adjusted to some degree by adjusting the drive current of the amplifier. Since the gain recovery time is of the same order as the gain saturation time, a single bit having the lower optical output level is sufficient to prepare the amplifier for another isolated bit or step input.

It is a second object of the present invention to provide a transmitter for use in an optical system which offers the above advantages.

According to that aspect of the invention such a transmitter comprises a light source, means for modulating the light source in response to an electrical signal to provide a modulated light signal having at least a high level and a low level, and an optical amplifier coupled to amplify the modulated light signal and, which produces an output overshoot on saturation. The light source and the means for modulating the light source have an electro-optical transfer function which results in pulse shortening, and the high level of the modulated light signal overdrives the optical amplifier.

It is a third object of the present invention to provide a repeater for use in an optical communication system which offers the above advantages.

According to a third aspect of the present invention them is provided a repeater for use in an optical communication system comprising an optical detector for converting a signal received from an optical channel to an electrical signal, a light source, means for modulating the light source in response to the electrical signal to provide a modulated light signal having at least a high level and a low level, and an optical amplifier coupled to amplify the modulated light signal and which provides an output overshoot on saturation. The amplifier output constitutes an output of the repeater. The light source and the means for modulating the light source have an electro-optical transfer function which results in pulse shortening, and the high level of the modulated light signal overdrives the optical amplifier.

BRIEF DESCRIPTION OF THE DRAWINGS

The present invention will now be described by way of example with reference to the accompanying drawings, in which.

DESCRIPTION OF THE PREFERRED EMBODIMENTS

Figure 1:
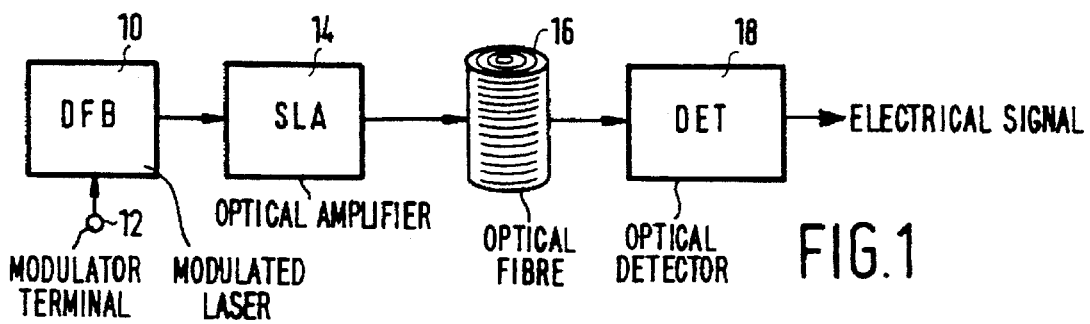
FIG. 1 is a block schematic diagram of a communication system in accordance with the invention, FIGS. 2A and B are diagrams to assist in an understanding of the present invention, FIGS. 3A and B show two waveforms demonstrating the effect of the present invention.

FIG. 1 shows a directly modulated laser module (DFB) 10 to which a modulating electrical signal is applied at a terminal 12. In practice the modulated laser module may be realised in a single package or alternatively as a constantly illuminated laser and a separate modulator as is known. A modulated light output from the laser module 10 is fed to an optical amplifier 14 such as a travelling wave laser amplifier, whose output in turn is fed to an optical fibre channel 16 (shown here wound on a drum). An output from the optical fibre channel is coupled to an optical detector 18, for example a photodiode and amplifier, to reconvert the optical signal back to an electrical signal. Couplings and optical isolators have been omitted for clarity and the optical fibre channel may include one or more repeaters.

Figure 2A:
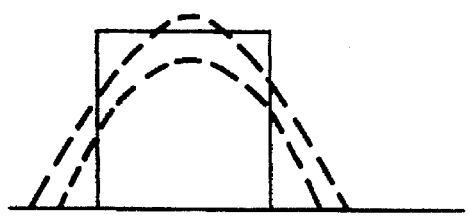

FIG. 2A shows a graph of the electro-optical transfer functions of two different directly modulated semiconductor laser modules together with a square wave electrical modulating signal. The vertical axis shows intensity and the horizontal axis shows time. The upper dotted curve represents an acceptable transfer function with good amplitude and pulse length. The lower dotted curve represents the response of a somewhat poorer laser, or at least one which is being operated at a higher bit rate than that for which it was specified. The lower curve shows a time-shortened and less intense pulse which has significantly less optical energy than that represented by the upper pulse. This results in a much smaller 'eye' for isolated bits in a digital communication system, with consequent range and error rate penalties. As the bit rate of the communication system is increased, so this poor transfer function becomes more significant in its effect on the error rate of the communication. The previous solution to this problem has been to develop better performing lasers having greater complexity and expense.

Figure 2B:
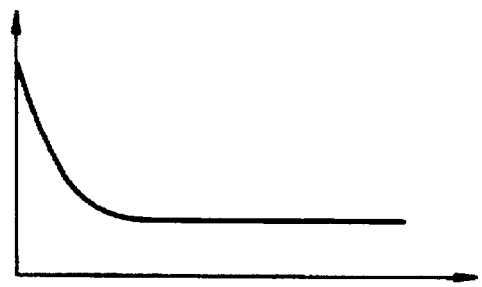

FIG. 2B shows the optical intensity of the response (vertical axis) of a travelling wave laser amplifier to an optical step input impulse applied at zero time on the time (horizontal) axis. The step input impulse is of sufficient amplitude to overdrive the amplifier considerably into saturation and the response is an overshoot which settles to a steady level in a recovery time of approximately 300 psec. The overshoot is as a result of quiescent carrier density in the quantum well of the laser which allows the laser to provide greater amplification after a period of time during which a large output intensity has not been provided. The amount of overshoot (to anything up to four or five times the steady state level) is related to the recovery time and these two are governed by the quiescent carrier density in the amplifier and the intensity of the input signal. Knowing the characteristics of the laser (with modulator if applicable) and the laser amplifier allows the intensity of the driving signal to be adjusted so that the intensity-time product of the light output lost because of the laser's poor electro-optical transfer function is substantially or totally compensated by the intensity time product of the higher intensity pulse provided during overshoot at the output of the laser amplifier.

Figure 3A:
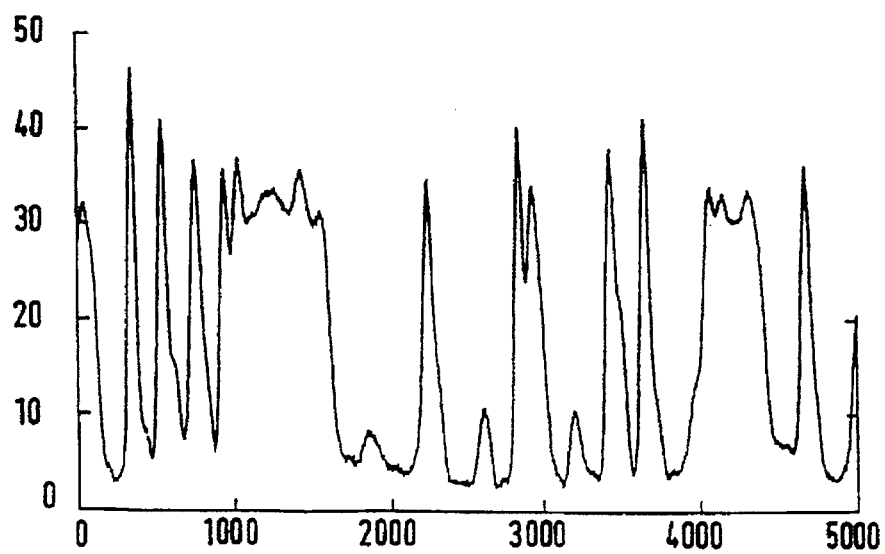
Figure 3B:
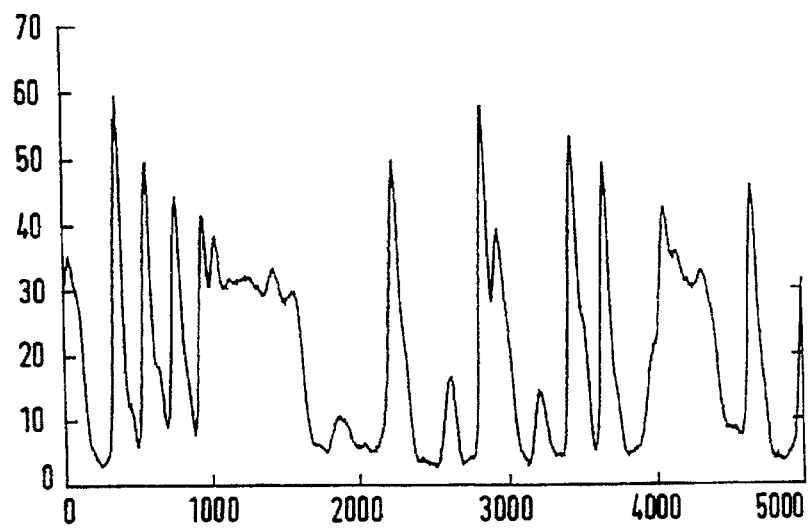

FIGS. 3A and B shows a pair of waveforms of light intensity (vertical axis) against time for the same 10 GHz modulating signal. The curve in FIG. 3A represents the output of a directly modulated semiconductor laser and the curve in FIG. 3B represents the output of a laser and laser amplifier combination as shown in FIG. 1. The intensity of the signal in FIG. 3B is approximately two orders of magnitude greater than that shown in FIG. 3A but what is important to note is the relative amplitude of the isolated bits. As can be seen, the intensity of the signal representing isolated bits or the first bit in a pattern has been selectively boosted by the laser amplifer. This gives a significantly better 'eye' for these parts of the transmitted signal which improves the bit error rate of the communication system.

Figure 4:
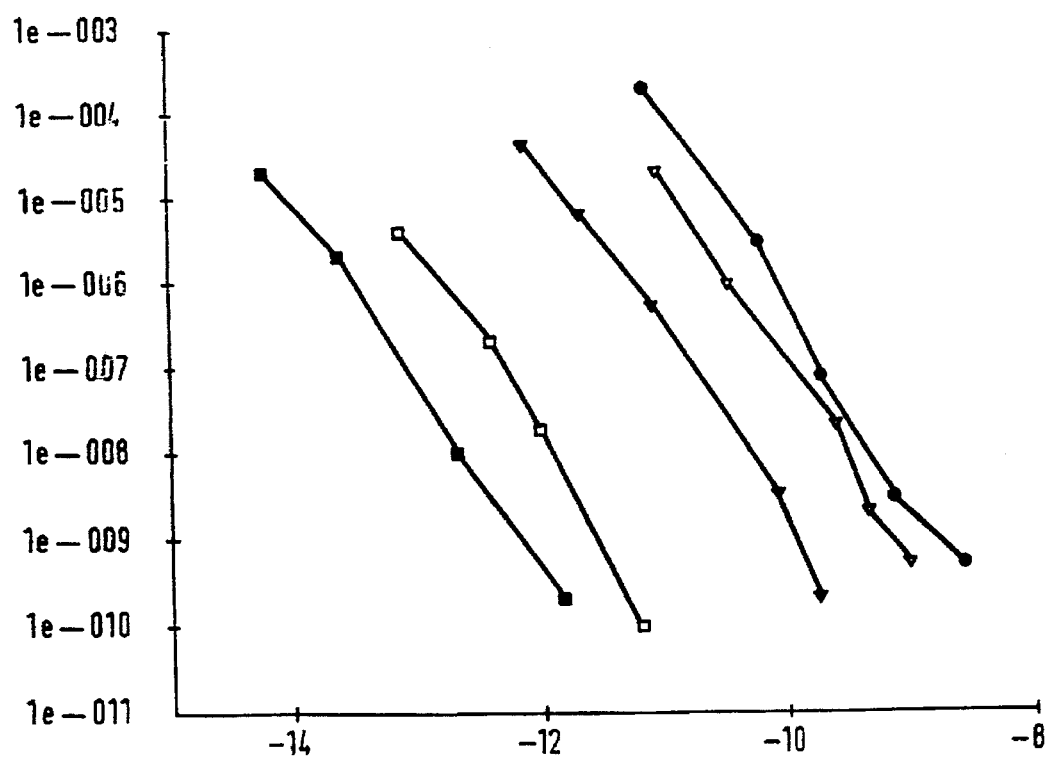
FIG. 4 shows a graph of bit error rate against received signal level for a communication system in accordance with the present invention.

FIG. 4 shows the bit error rate (vertical axis) against the receiver input level for four different overdriving levels of the laser amplifier together with the reference performance of the laser itself with no amplification. The reference is denoted by the five circle points. The remaining points represent levels of laser amplifier input of −18 dBm (hollow triangle), −15 dBm (filled triangle), −12 dBm (hollow square), and −9 dBm (filled square). As can be seen, the bit error rate performance improves with increased input intensity to the laser amplifier, in other words with increasing overdriving.

Figure 5:
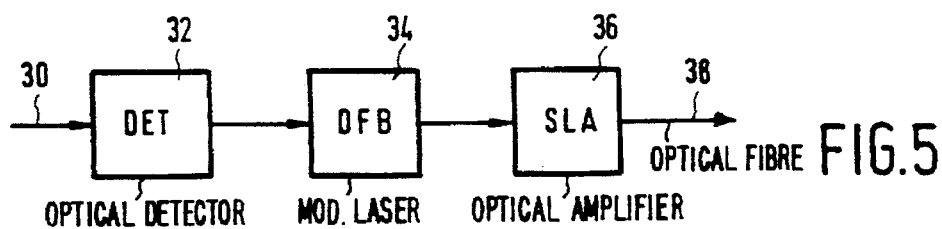
FIG. 5 is a block schematic diagram of an optical repeater in accordance with the third aspect of the present invention.

FIG. 5 shows a block schematic diagram of an optical repeater is accordance with the present invention. An incoming optical fibre is coupled to a detector 32 which operates in a similar manner to the optical detector 18 shown in FIG. 1. An electrical output of the detector 32 is connected to a direct modulated laser 34 which is modulated to a level which overdrives a following optical amplifier 36 considerably. The mechanism for this is as described above for the optical communication system. An output from the amplifier 36 is connected to an optical fibre 38 along which the boosted signal continues to travel. An equaliser to compensate for the effects of multimode propagation and intersymbol interference may be provided between the detector 32 and the laser 34 as required.

I claim:

1. An optical communication system comprising:

a light source;

means for modulating the light source in response to an electrical digital signal to provide a digitally modulated light signal having pulses extending between a low level and a high level;

an optical amplifier coupled to the light source to receive and amplify the modulated light signal, which amplifier has an output overshoot characteristic when overdriven into saturation;

an optical channel over which the amplified light signal from the amplifier is transmitted; and an optical detector for converting a light signal received from the optical channel into an electrical signal;

characterized in that the light source and the means for modulating the light source together provide an electro-optical transfer function which results in pulse shortening of the modulated light signal, the high level pulses of the modulated light signal overdrive the optical amplifier into saturation, and the digital signal has a bit period T and the output overshoot of the amplifier matches the pulse shortening of the modulated light signal caused by the electro-optical transfer function, whereby the intensity integral of a high level pulse of the amplified light signal over the bit period T is substantially the same for an isolated bit as for successive bits in a bit stream.

2. A communication system as claimed in claim 1, characterised in that the optical amplifier has an overshoot characteristic with a gain saturation time approximately equal to the period T.

3. A communication system as claimed in any one of the claim 1, characterised in that the optical amplifier is a semiconductor optical amplifier.

4. A transmitter for use in an optical communication system, said transmitter comprising:

a light source;

means for modulating the light source in response to an electrical digital signal to provide a digitally modulated light signal having pulses extending between a low level and a high level; and an optical amplifier coupled to the light source to receive and amplify the modulated light signal; which amplifier has an output overshoot characteristic when overdriven into saturation;

characterized in that
- the light source and the means for modulating the light source together provide an electro-optical transfer function which results in pulse shortening of the modulated light signal,
- the high level pulses of the modulated light signal overdrive the optical amplifier into saturation, and
- the digital signal has a bit period T and the output overshoot of the amplifier matches the pulse shortening of the modulated light signal caused by the electro-optical transfer function,
- whereby the intensity integral of a high level pulse of the amplified light signal over the bit period T is substantially the same for an isolated bit as for successive bits in a bit stream.

5. A repeater for use in an optical communication system, said repeater comprising:
- an optical detector for converting a digitally modulated light signal received from an optical channel into an electrical digital signal;
- a light source;
- means for modulating the light source in response to the electrical digital signal to provide a digitally modulated light signal having pulses extending between a low level and a high level; and
- an optical amplifier coupled to the light source to receive and amplify the modulated light signal; which amplifier has an output overshoot characteristic when overdriven into saturation and whose output constitutes an output of the repeater;

characterised in that
- the light source and the means for modulating the light source together provide an electro-optical transfer function which results in pulse shortening of the modulated light signal,
- the high level pulses of the modulated light signal overdrive the optical amplifier into saturation, and
- the digital signal has a bit period T and the output overshoot of the amplifier matches the pulse shortening of the modulated light signal caused by the electro-optical transfer function,
- whereby the intensity integral of a high level pulse of the amplified light signal over the bit period T is substantially the same for an isolated bit as for successive bits in a bit stream.

* * * * *